(12) United States Patent
Nakade et al.

(10) Patent No.: US 7,752,640 B2
(45) Date of Patent: Jul. 6, 2010

(54) OPTICAL DISK DEVICE

(75) Inventors: Isamu Nakade, Ishikawa (JP); Tsukasa Nakayama, Kanagawa (JP); Kazunori Hasegawa, Kanagawa (JP); Kenji Urushihara, Kanagawa (JP); Hiroto Nishida, Ishikawa (JP)

(73) Assignee: Panasonic Corp., Osaka (JP)

( * ) Notice: Subject to any disclaimer, the term of this patent is extended or adjusted under 35 U.S.C. 154(b) by 572 days.

(21) Appl. No.: 11/814,225

(22) PCT Filed: Jan. 19, 2006

(86) PCT No.: PCT/JP2006/300744

§ 371 (c)(1),
(2), (4) Date: Jul. 18, 2007

(87) PCT Pub. No.: WO2006/077926

PCT Pub. Date: Jul. 27, 2006

(65) Prior Publication Data

US 2009/0025019 A1    Jan. 22, 2009

(30) Foreign Application Priority Data

Jan. 20, 2005    (JP) .................................. 2005-013036

(51) Int. Cl.
*G11B 17/028*    (2006.01)
(52) U.S. Cl. ......................................... 720/604
(58) Field of Classification Search ............... 720/604, 720/605, 620
See application file for complete search history.

(56) References Cited

U.S. PATENT DOCUMENTS 6,438,087 B2 * 8/2002 Omori ........................ 720/604
6,538,970 B1 * 3/2003 Fujiwara et al. ............. 720/604
7,287,261 B2 * 10/2007 Kato et al. ................... 720/604
7,444,650 B2 * 10/2008 Ito .............................. 720/619

FOREIGN PATENT DOCUMENTS

| JP | 09-245405 | 9/1997 |
| JP | 10-241247 | 9/1998 |
| JP | 2002-288909 | 10/2002 |
| JP | 2002-352496 | 12/2002 |
| JP | 2003-257115 | 9/2003 |

OTHER PUBLICATIONS

International Search Report for Application No. PCT/JP2006/300744 dated Apr. 18, 2006.

* cited by examiner

*Primary Examiner*—Angel A. Castro
(74) *Attorney, Agent, or Firm*—RatnerPrestia (57) ABSTRACT

An optical disc device and a disc changer drive capable of achieving a reduction in cost and number of articles and a reduction in size of the disc drive with a simple configuration rather than the prior art and also carrying out a stable playing/writing operation are provided. An optical disc device includes a playing chassis which is supported turnably on a main body of the disc drive and on which a turntable is installed, a substantially Y-shaped cam groove formed on the playing chassis, a driving lever on which a substantially T-shaped cam groove is formed and which transmits a power to a holding portion of the disc, and a turning lever supported turnably on the main body and engaged with the playing chassis and the cam groove of the driving lever via a driving shaft, wherein a turning of the turning lever is followed by a turning of the playing chassis and a movement of the driving lever that follows the turning of the playing chassis to hold a disc as a series of operations.

3 Claims, 13 Drawing Sheets

OPTICAL DISK DEVICE

THIS APPLICATION IS A U.S. NATIONAL PHASE APPLICATION OF PCT INTERNATIONAL APPLICATION PCT/JP2006/300744.

TECHNICAL FIELD

The present invention relates to an optical disc device for CD (Compact Disc), DVD (Digital Versatile Disc), and the like, and a disc changer drive for recording/playing the disc selectively.

BACKGROUND ART

Figure 13:
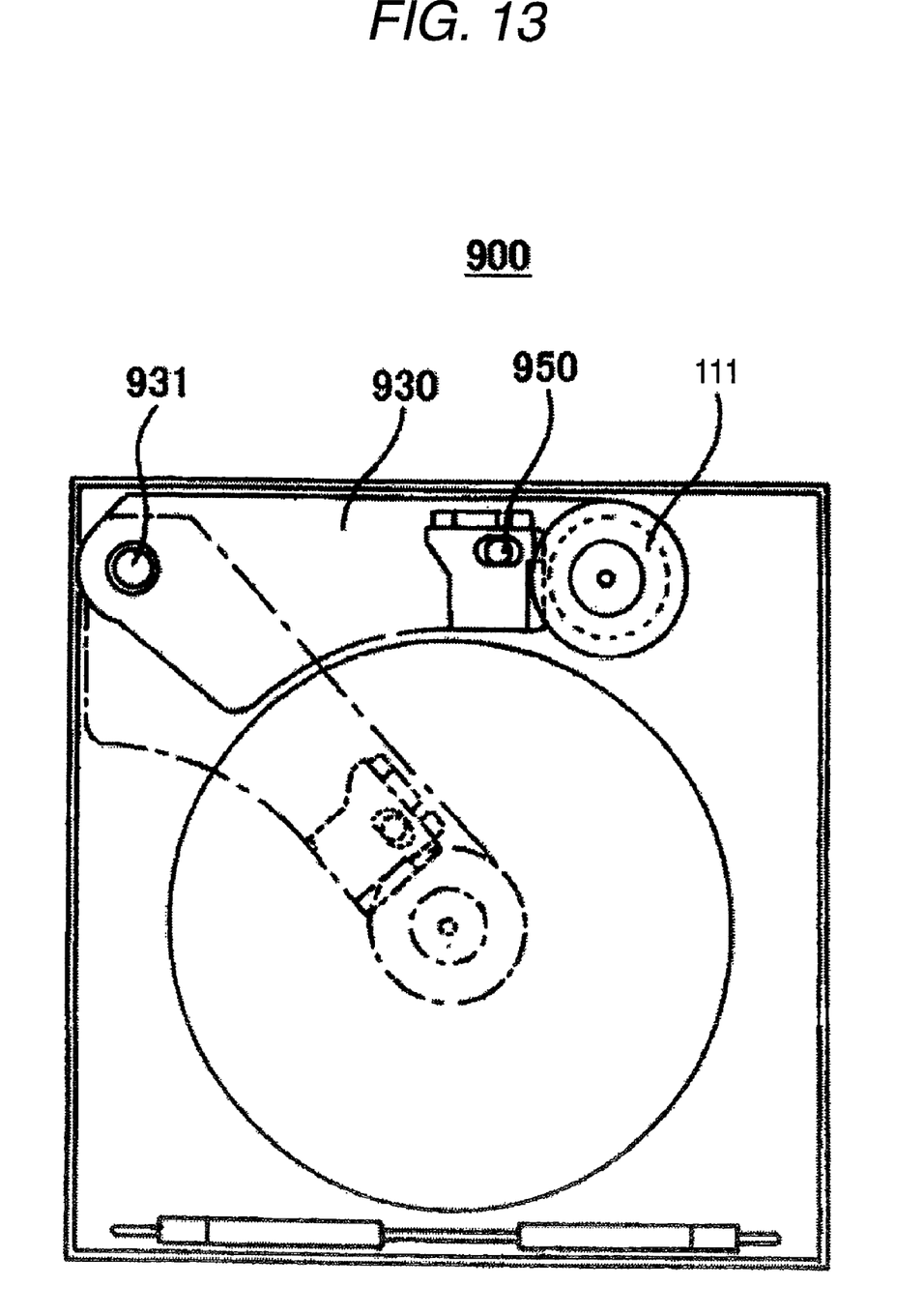
FIG. 13 A plan view showing an optical disc device in the prior art.

Owing to diversification of the fitting location, miniaturization is often demanded of the optical disc device and the disc changer drive as in the onboard one, for example. As the publicly known optical disc device and disc changer drive of this type, as shown in FIG. 13, for example, there is such a disc changer drive 900 in which a plurality of optical discs 990 are loaded previously in the inside and, when the optical disc is played, a playing portion 930 to which a turntable 111 and an optical pickup unit 950 are provided is turned on a turning shaft 931 and is set in a playing position under the optical disc to be played and then the optical disc is clamped on the turntable 111.

Figure 14:
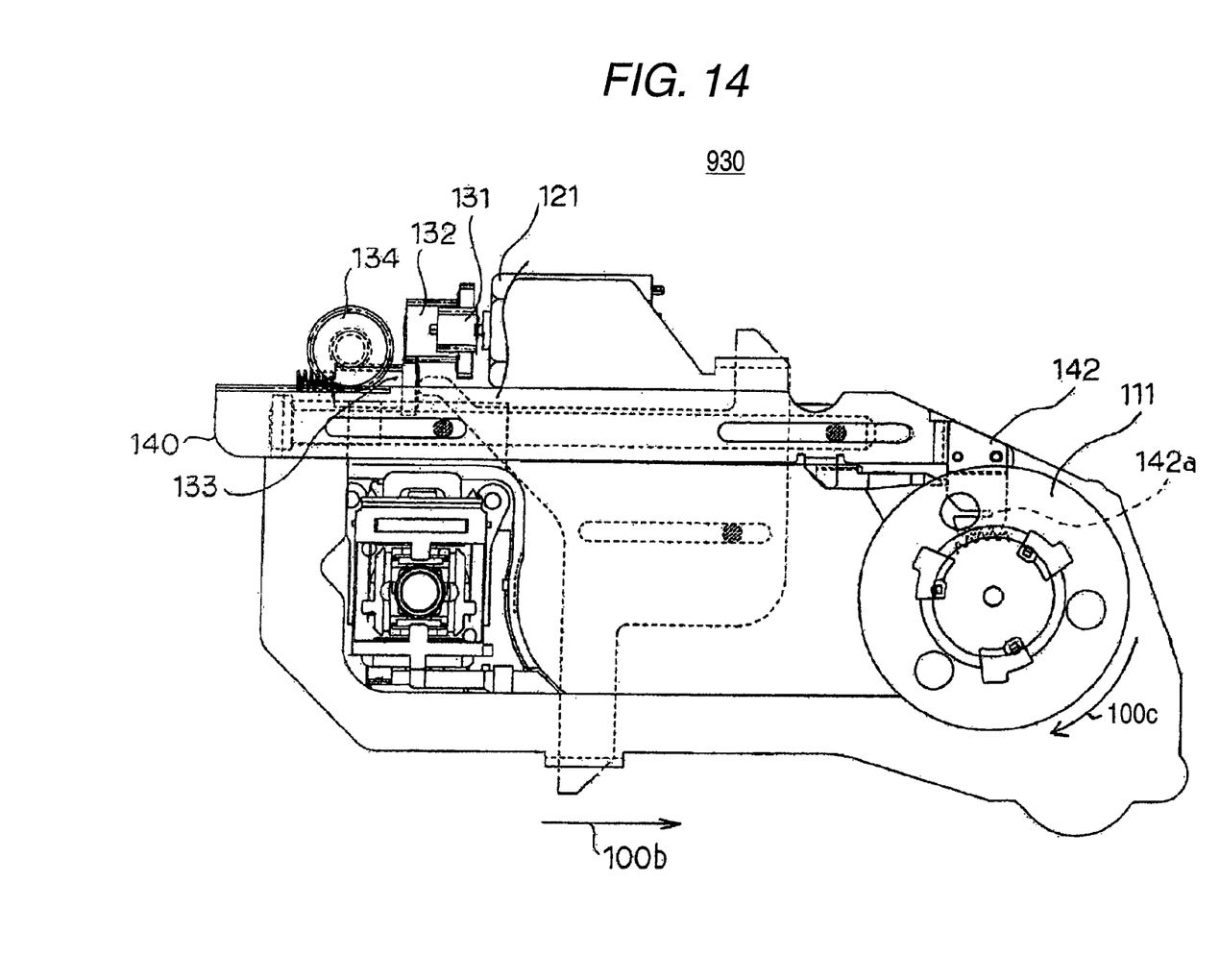
FIG. 14 A plan view showing a playing portion of the optical disc device in the prior art.
Figure 15:
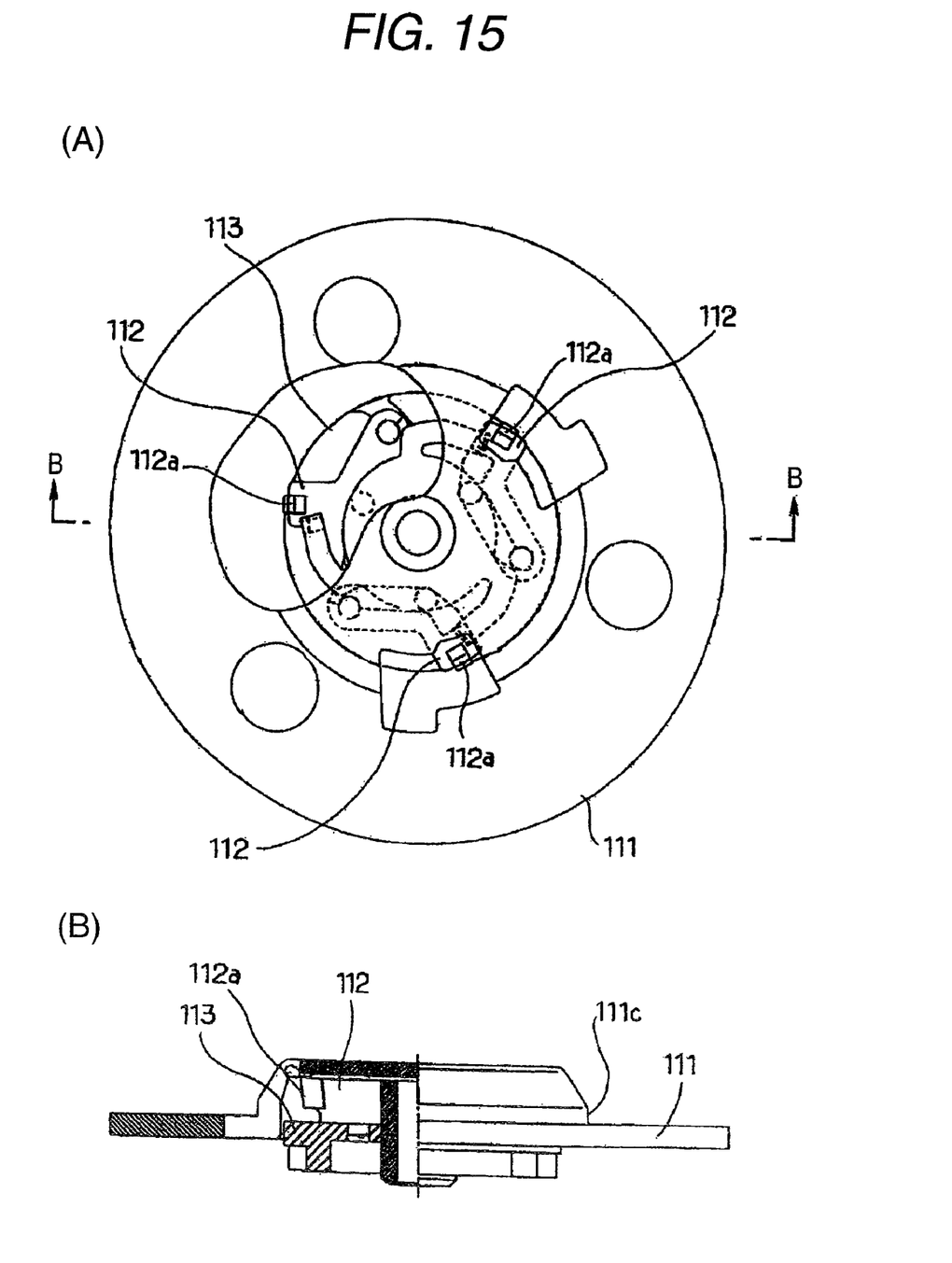

In the above disc changer drive 900, as the configuration for clamping the optical disc on the turntable, the configuration shown in FIG. 14 and FIG. 15 is known.

More particularly, when the playing portion 930 comes up to the playing position and the disc is loaded on the turntable 111, a sensor senses that the disc has been loaded on the turntable 111 and a pickup driving motor 121 is rotated to move a power transmission lever 140 via gears 131, 132, 133, 134 in the direction indicated with an arrow 100b. Then, the power transmission lever 140 is moved in the direction indicated with the arrow 100b, and an output rack 142a provided to a power outputting portion 142 of the power transmission lever 140 turns a cam member 113 in the direction indicated with an arrow 100c. Then, projection portions 112a of projection members 112 are projected outward from fitting portions 111c in the turntable 111 by this turning force while utilizing energizing forces of springs provided on the insides of the fitting portions 111c, the cam grooves, etc. to clamp the optical disc (see JP-A-2002-288909, for example).

DISCLOSURE OF THE INVENTION

Problems that the Invention is to Solve

However, in the optical disc changer drive 900 in the prior art, upon playing the optical disc or canceling the play of the disc, such a configuration is employed that the driving force is transmitted via separate power transmission mechanisms in a turning operation of the playing portion and an operation of a clamping mechanism respectively. Therefore, there existed the problem that the number of articles is increased and thus a size of the disc drive is increased. Also, the playing portion and the clamping mechanism are driven via the separate power transmission mechanisms respectively. Therefore, it is possible that a stable operation of the disc drive is disturbed because these separate power transmission mechanisms are out of synch in generating the driving force.

The present invention has been made to solve the problems in the prior art, and it is an object of the present invention to provide an optical disc device and a disc changer drive, capable of achieving a reduction in cost and number of articles and a reduction in size of the disc drive with a simple configuration and also carrying out a stable playing/writing operation by eliminating a discrepancy in timings between a swinging operation of a playing portion and a clamping operation.

Means for Solving the Problems

An optical disc device of the present invention, includes a main body; a clamping mechanism for holding a disc releasably on a turntable; a playing chassis which is turnably supported on the main body and on which the turntable is mounted; a substantially Y-shaped cam groove formed on the playing chassis; a driving lever on which a substantially T-shaped cam groove is formed and which transmits a power to a holding portion of the disc; and a turning lever supported turnably on the main body and engaged with the playing chassis and the cam groove of the driving lever via a driving shaft; wherein a turning of the turning lever is followed by a turning of the playing chassis and a movement of the driving lever as a series of operations.

According to this configuration, when the disc is played or the play of the disc is canceled, a driving force for turning the playing chassis can also be transmitted simultaneously to the driving lever by means of actions of the substantially Y-shaped cam groove formed on the playing chassis and the substantially T-shaped cam groove formed on the driving lever. Therefore, a turning operation of the playing chassis and a disc clamping/unclamping operation of the clamping mechanism can be carried out as a series of operations.

Also, in the optical disc device of the present invention, the driving shaft of the turning lever passes through the substantially T-shaped cam groove of the driving lever and the substantially Y-shaped cam groove of the playing chassis to engage with the cam grooves, and the playing chassis and the driving lever are moved to follow the turning of the turning lever as a series of operations such that the playing chassis swings when the turning lever being turned pushes the substantially Y-shaped cam groove via the driving shaft and then the driving lever moves when the driving shaft being moved in the substantially Y-shaped cam groove pushes the substantially T-shaped cam groove while maintaining a posture of the playing chassis.

According to this configuration, when the turning lever is turned, first the substantially Y-shaped cam groove is pushed via the driving shaft and the playing chassis is swung. When the swinging operation of the playing chassis is completed, next the driving shaft being rotated further moves in the cam groove portion formed in the substantially Y-shaped cam groove, then pushes the substantially T-shaped cam groove while maintaining the posture of the playing chassis, and then moves the driving lever toward a center of the disc.

Also, a disc changer drive of the present invention equipped with the optical disc device described above.

According to this configuration, the small-size disc changer drive capable of carrying out a stable playing/writing operation with good accuracy can be obtained at a low cost.

Advantages of the Invention

The present invention is constructed such that, when the turning lever is turned, the turning operation of the playing chassis and the clamping operation of the disc are performed as a series of operations by a single drive. Therefore, a reduction in number of articles and a reduction in size of the disc drive can be achieved and a stable playing/writing operation can be carried out by eliminating a discrepancy in operation timings.

BRIEF DESCRIPTION OF THE DRAWINGS

FIG. 4(A) A plan view of a playing portion of the optical disc device according to the embodiment of the present invention, and (B) A front view of the playing portion of the optical disc device according to the embodiment of the present invention.

FIG. 5(A) A plan view of a clamping portion of the optical disc device according to the embodiment of the present invention, and (B) A sectional view of the clamping portion of the optical disc device according to the embodiment of the present invention when viewed along a B-B position in FIG. 5(A).

FIG. 7(A) A plan view of the clamping mechanism of the optical disc device according to the embodiment of the present invention, (B) A sectional view of the clamping mechanism when viewed along a B-B position in FIG. 7(A), and (C) An enlarged view around an energizing spring 50 in FIG. 7(A).

FIG. 9(A) A plan view of a projection portion of the clamping mechanism of the optical disc device according to the embodiment of the present invention, (B) A side view of the projection portion when viewed from a B direction in FIG. 9(A), and (C) A sectional view of the projection portion when viewed along a C-C position in FIG. 9(A).

FIG. 10(A) A side view of an elevating member of a clamping mechanism of the optical disc device according to the embodiment of the present invention, and (B) A sectional view of the elevating member of the clamping mechanism of the optical disc device according to the embodiment of the present invention.

FIG. 15(A) A plan view of a clamping mechanism of the optical disc device in the prior art, and (B) A sectional view of the clamping mechanism when viewed along a B-B position in FIG. 15(A).

Description of Reference Numerals and Signs 10 optical disc device
12 disc
12a recording face
12b label face
12c hollow portion
13 main body
20 playing portion
21 playing chassis (suspension chassis)
24 cam groove
24a cam groove portion
25 turning lever
26 turning/driving shaft
31 turntable
35 chuck claw
49 driving lever

BEST MODE FOR CARRYING OUT THE INVENTION

An optical disc device and a disc changer drive of an embodiment of the present invention will be explained with reference to the drawings hereinafter.

Figure 1:
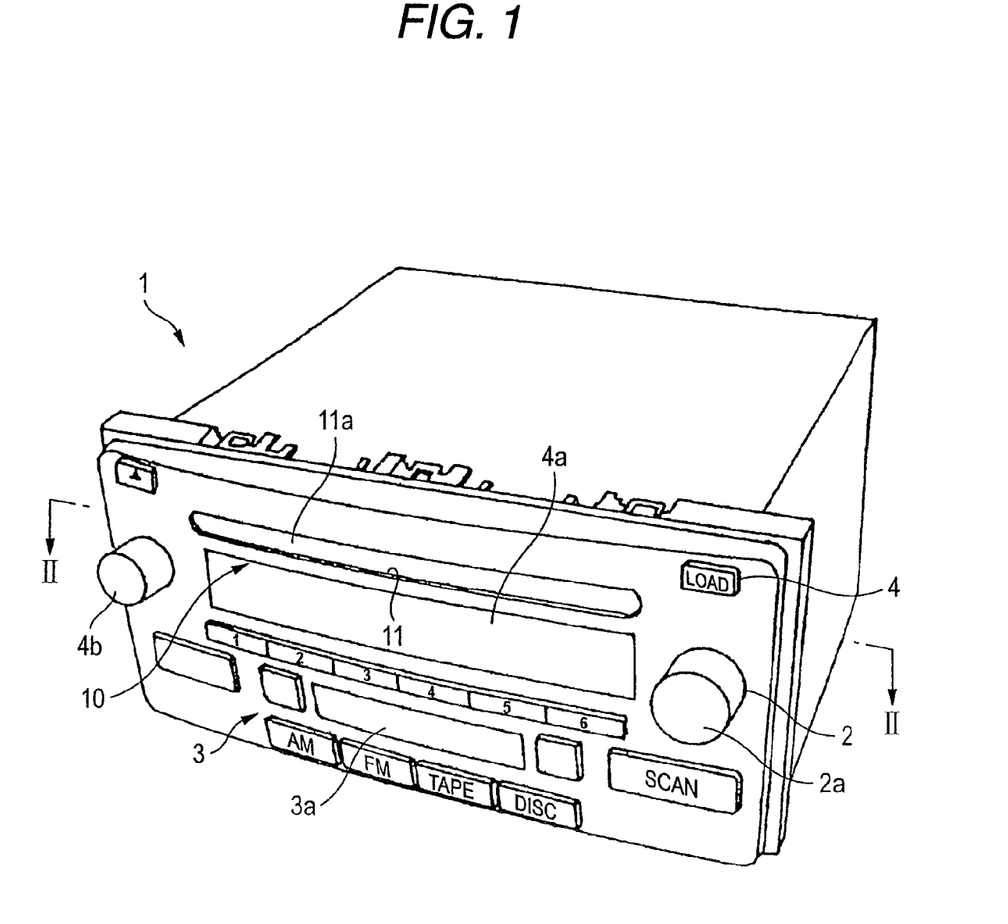
FIG. 1 A general perspective view of a car audio equipment in which an optical disc device according to an embodiment of the present invention is built.

An embodiment of the present invention is shown in FIG. 1.

A general perspective view of a car audio equipment 1 in which an optical disc device 10 according to an embodiment of the present invention is built is shown in FIG. 1. A radio 2, a cassette tape player 3, etc. as well as the optical disc device 10 are built in the car audio equipment 1. An optical disc slot 11 for the optical disc device 10, a radio tuning knob 2a, a cassette tape insertion slot 3a, and the like are provided to a front panel 4 in addition to a display portion 4a used commonly in all functions and a power/volume knob 4b. Also, a controlling portion 5 for controlling the radio 2, the cassette tape player 3, the optical disc device 10, etc. is provided on the inside.

Figure 2:
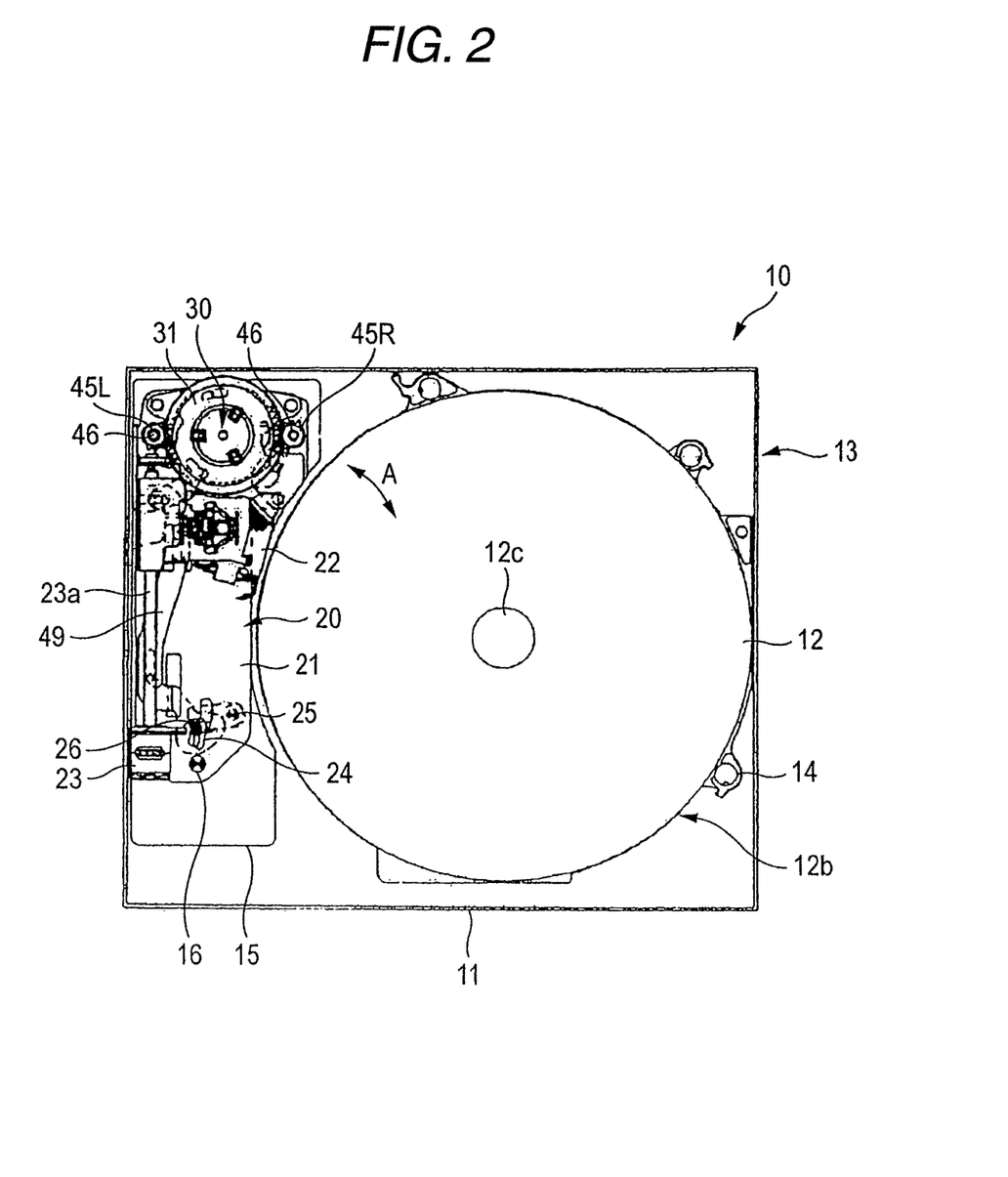
FIG. 2 A plan view showing a standby state of the optical disc device according to the embodiment of the present invention when viewed along a II-II position in FIG. 1.
Figure 3:
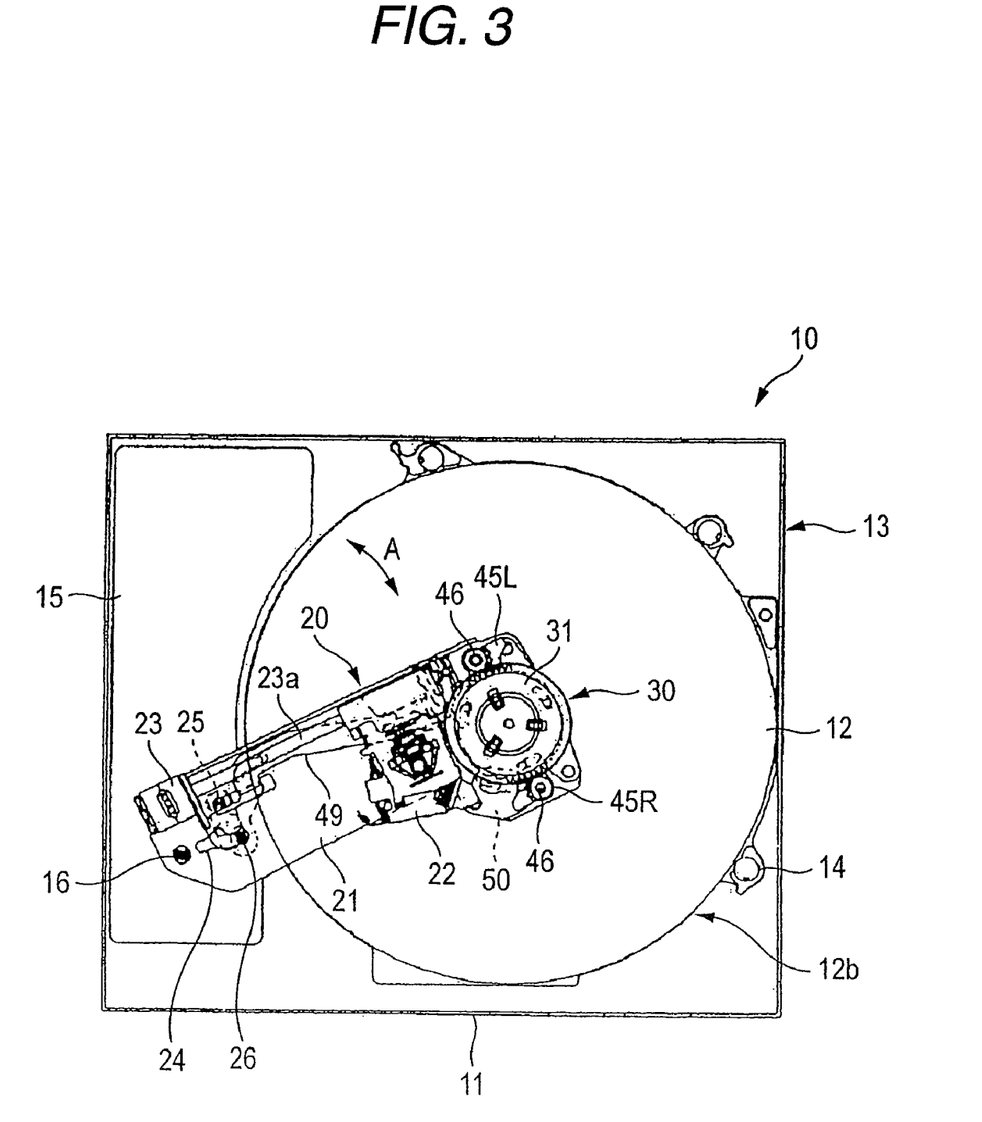
FIG. 3 A plan view showing a standby state of the optical disc device according to the embodiment of the present invention when viewed along the II-II position in FIG. 1.

A plan view showing the optical disc device 10 according to the embodiment of the present invention, which is built in the car audio equipment 1, when viewed along a II-II position in FIG. 1 is shown in FIG. 2 and FIG. 3 respectively. As shown in FIG. 2 and FIG. 3, the optical disc device 10 includes a rectangular box-like main body 13, plural sheets of trays 14 stacked in the main body 13 to put a disc 12 thereon respectively, a tray opening/closing unit (not shown) provided to a base 15, which is fixed at a predetermined height position in the main body 13, to open/close a boundary between predetermined trays 14, and a playing portion 20 supported to turn on a shaft 16 provided on the base 15 in the direction indicated with an arrow A.

The playing portion 20 has a flat-plate playing chassis (referred to as a "suspension chassis" hereinafter) 21 that is turned on the shaft 16, and the suspension chassis 21 has a clamping mechanism 30 that clamps the disc 12. Also, the suspension chassis 21 has a pickup 22 supported to reciprocally move along the suspension chassis 21 such that it can access the disc 12 that is clamped by the clamping mechanism 30 and is rotated, and a drive motor 23 and a lead screw 23a for moving the pickup 22. Also, a substantially Y-shaped cam groove 24 is formed in vicinity of the shaft 16 of the suspension chassis 21, and a turning/driving shaft 26 provided upright on a turning lever 25 engages with the cam groove 24.

Next, the clamping mechanism 30 will be explained in detail with reference to FIG. 4 to FIG. 12 hereunder.

The clamping mechanism 30 has a turntable 31 provided to a top end of the suspension chassis 21 to hold and rotate the disc 12, a loading portion 32 on which a recording face 12a (see FIG. 7) of the disc 12 is loaded, a substantially cylindrical projection portion 33 projected to the label face 12b (see FIG. 7) of the disc 12 from the loading portion 32 through a hollow portion 12c (see FIG. 2) of the disc 12, a plurality of chuck claws 35 retracted from chuck claw fitting windows 37 formed at plural locations (e.g., three locations herein) on a peripheral surface of the projection portion 33 to engage with the label face 12b when each of these claws is turned on a pivot 34 along the tangential direction of the projection portion 33 as a fulcrum, and a pushing member 36 (see FIG. 10) to which pushing portions 36a (see FIG. 8) that push base end portions 35a of respective chuck claws 35 when such member is moved along the axial line of the projection portion 33 are provided.

Figure 5:
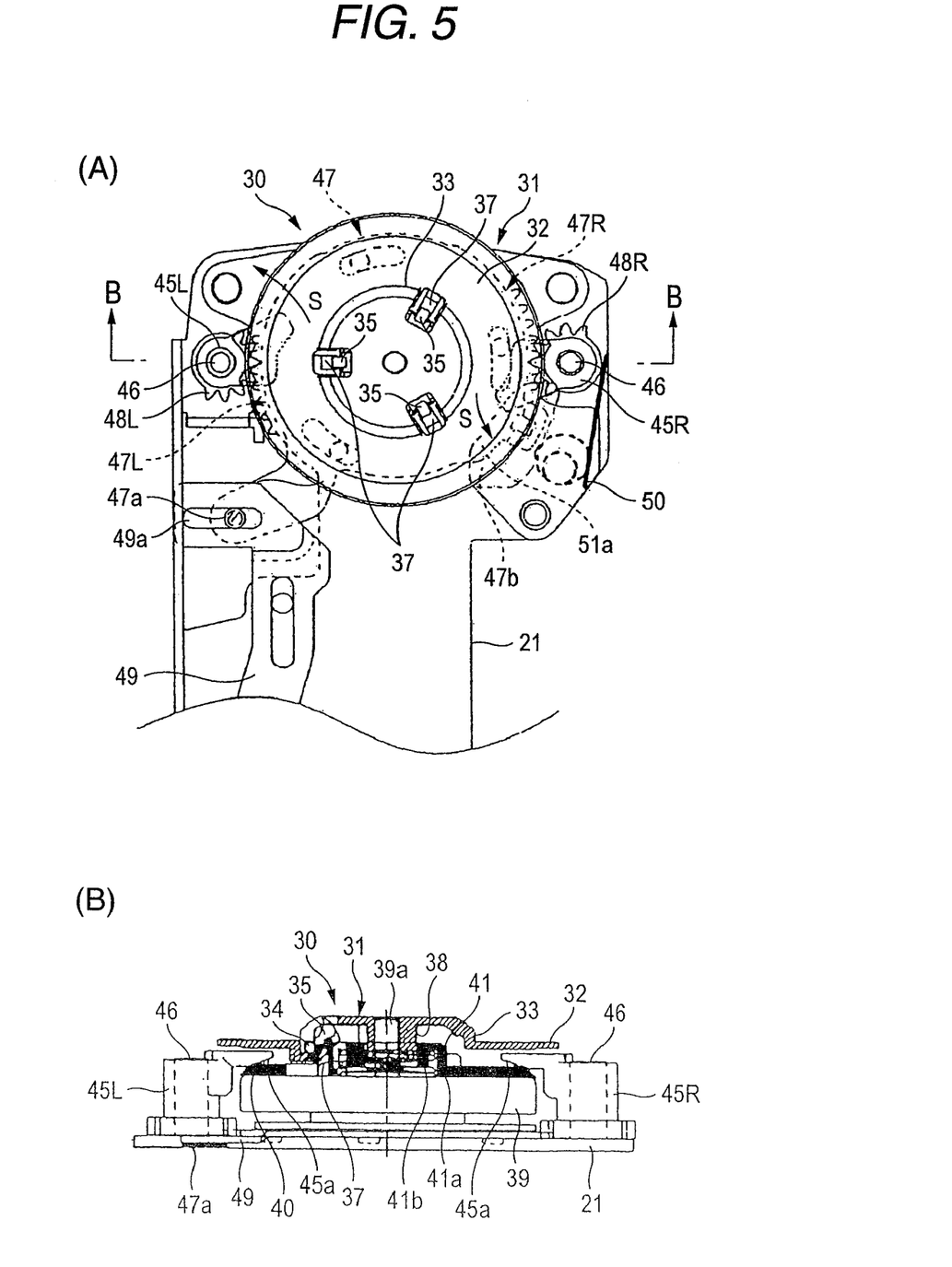
Figure 7:
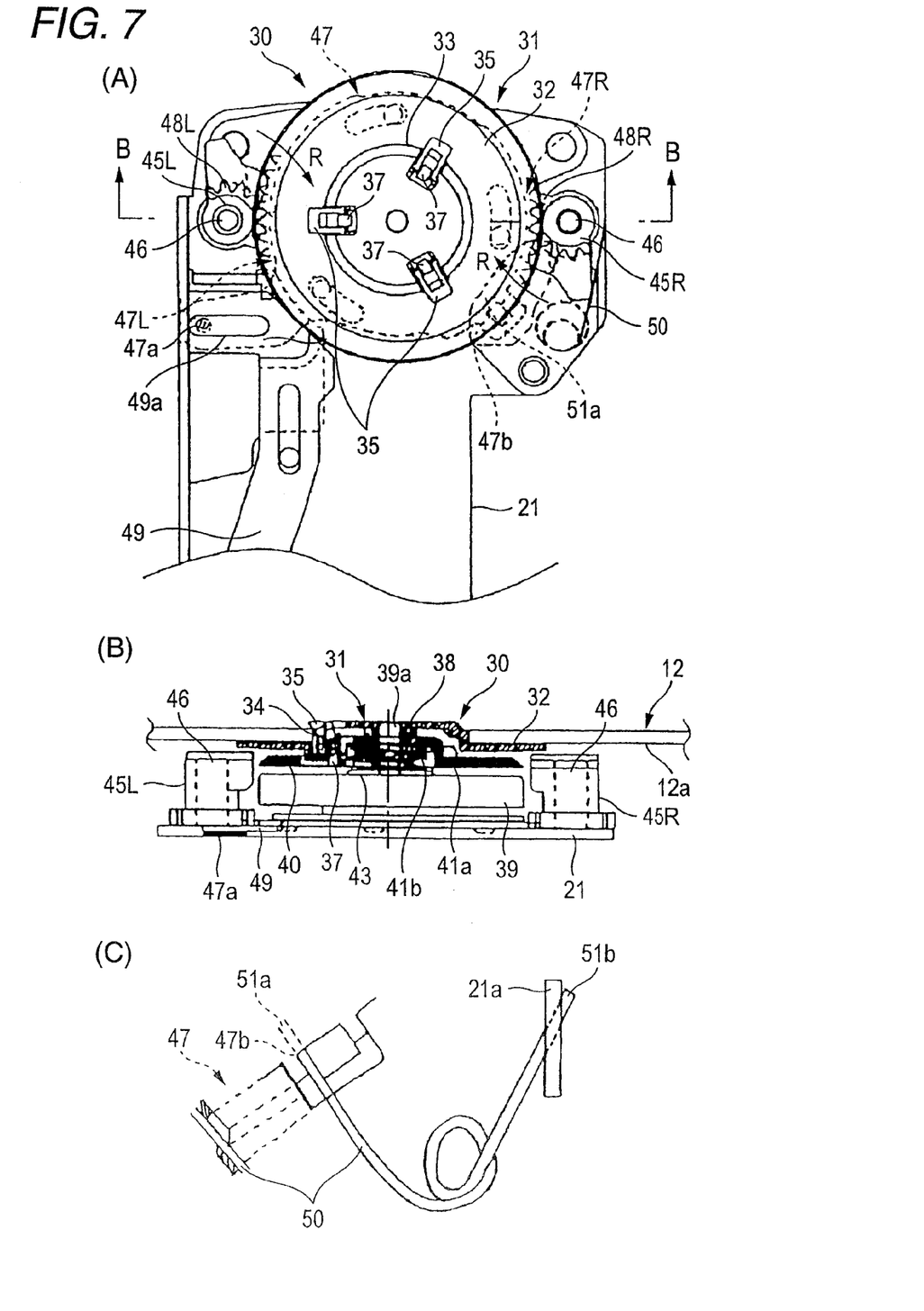

As shown in FIG. 5 and FIG. 7, elevating levers 45L, 45R for putting down an elevating member 40 against an energizing force of a clamping spring 43 are provided insertably between the turntable 31 and the elevating member 40. The elevating levers 45L, 45R are provided as a pair to the top end portion of the suspension chassis 21 in positions that oppose to each other to put the turntable 31 between them. The elevating levers 45L, 45R are provided to the suspension chassis 21 to turn on a turning center 46 respectively. Also, a taper 45a is provided to top ends of the elevating levers 45L, 45R, which are inserted between the turntable 31 and the elevating member 40 to bring down the elevating member 40, respectively.

A coupling plate 47 for coupling the left and right elevating levers 45L, 45R is provided to a lower surface of the top end portion of the suspension chassis 21 to turn coaxially with a center of the turntable 31. Also, gear portions 47L, 47R are provided to left and right both ends of the coupling plate 47. The gear portions 47L, 47R are engaged with gear portions 48L, 48R, which are provided to lower outer peripheral surfaces of the left and right elevating levers 45L, 45R, respectively.

In contrast, a driving lever 49 is provided to the upper surface of the suspension chassis 21 to move along the longitudinal direction of the suspension chassis 21. A cam groove 49a (see FIG. 4, FIG. 5, FIG. 7, FIG. 11) is provided to a top end of the driving lever 49 on the turntable 31 side and is fitted movably in a driving shaft 47a that is provided to the coupling plate 47.

Also, a substantially T-shaped cam groove 49b (see FIG. 4, FIG. 11) is provided to the other end of the driving lever 49. The turning/driving shaft 26 provided upright on the turning lever 25 is engaged with the cam groove 49b and the substantially T-shaped cam groove 24 of the suspension chassis 21.

Figure 6:
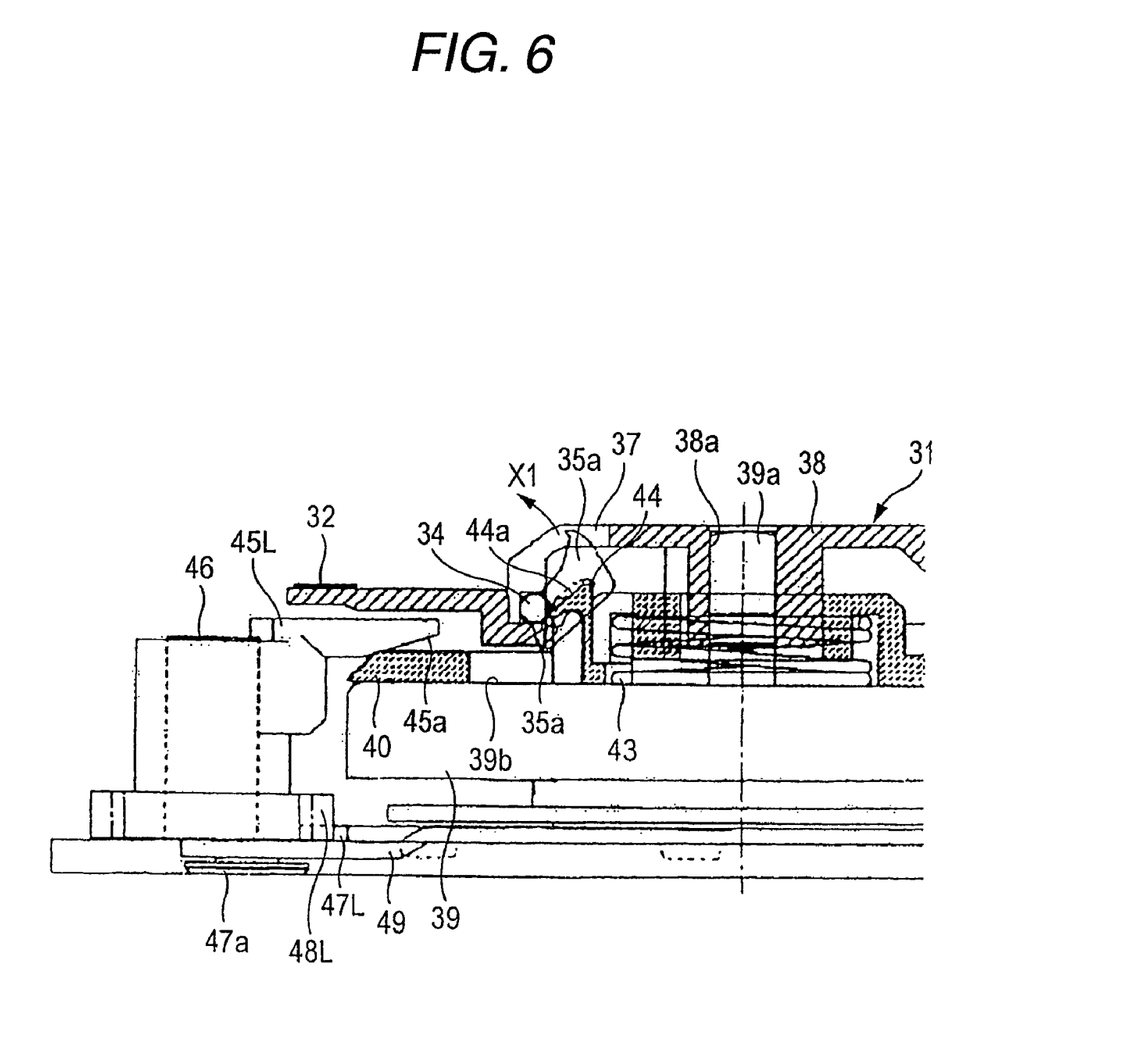
FIG. 6 A pertinent enlarged sectional view of a clamping mechanism of the optical disc device according to the embodiment of the present invention.
Figure 8:
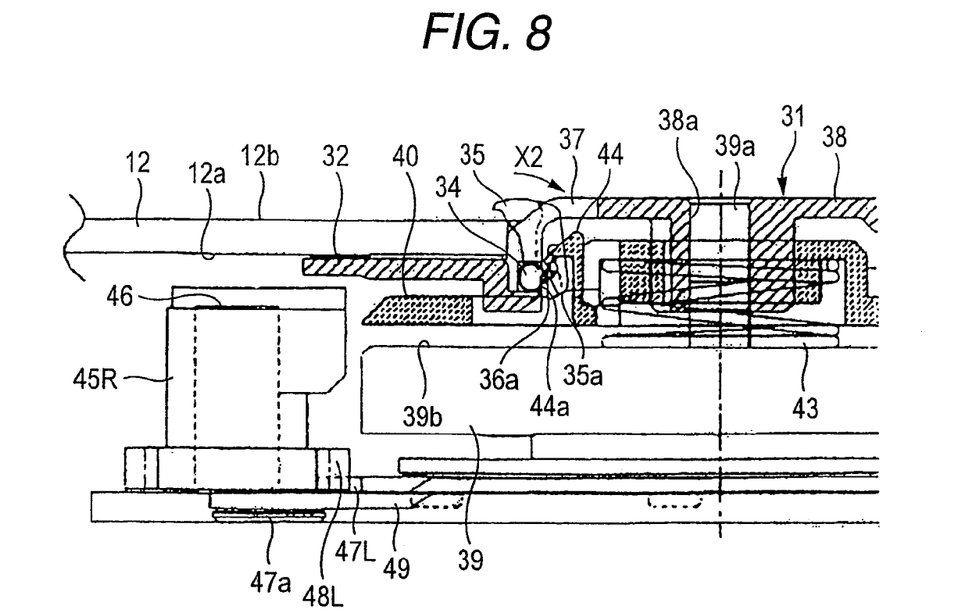
FIG. 8 A pertinent enlarged sectional view of a clamping mechanism of the optical disc device according to the embodiment of the present invention.

As shown in FIG. 6 and FIG. 8, a cylinder portion 38 is formed at a center of the turntable 31 in the rotation center direction. A center shaft through hole 38a is provided in the cylinder portion 38 to pass through a center shaft. An upper surface 39a of a rotating motor 39 as a rotating/driving unit is fitted into the center shaft through hole 38a such that the turntable 31 is turned/driven by the rotating motor 39.

Also, the elevating member 40 provided to slide in the direction perpendicular to the loading portion 32 (vertical direction of the drawing) is fitted on the cylinder portion 38 of the turntable 31. The clamping spring 43 for energizing the elevating member 40 upwardly is provided between the elevating member 40 and an upper surface 39b of the rotating motor 39. The chuck claw fitting windows 37 are provided to a side surface of the projection portion 33 of the turntable 31 at an equal interval (e.g., a central angle 120 degree) in the circumferential direction. The chuck claws 35 are provided retractably in the chuck claw fitting windows 37.

Figure 9:
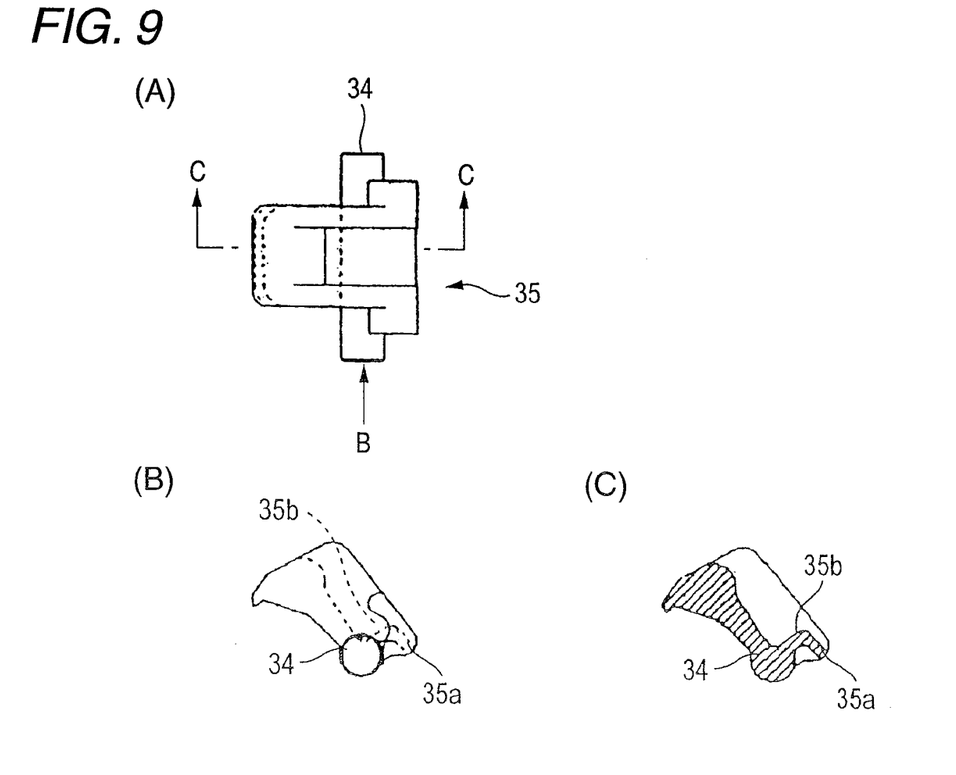

As shown in FIG. 9, the pivot 34 is provided under the chuck claw 35 and the base end portion 35a is provided in vicinity of this pivot 34 to project downward. A stepped groove portion 35b is formed on an inner center portion of a main body of the chuck claw 35.

Figure 10:
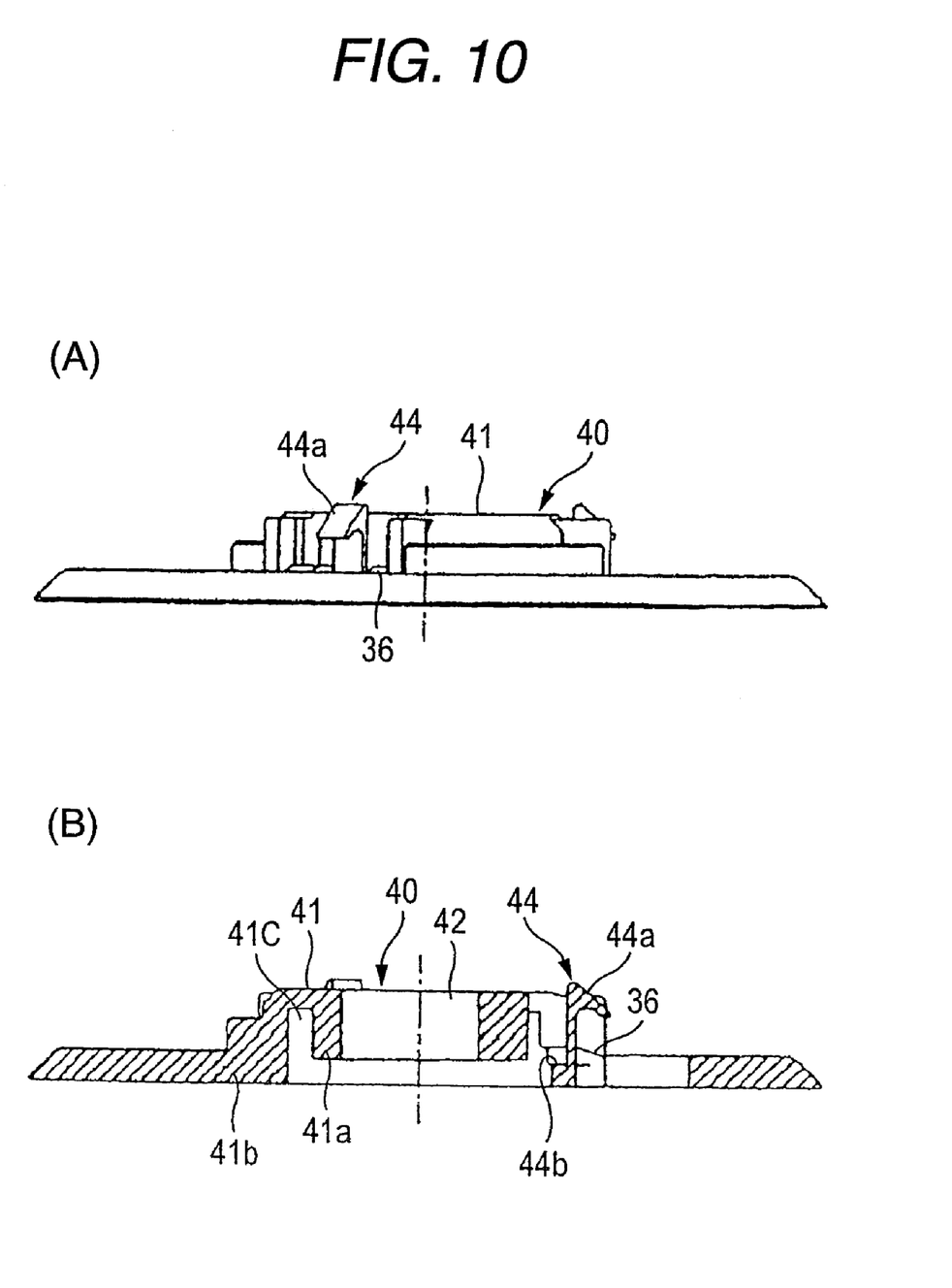

Also, as shown in FIG. 5 and FIG. 10, a cylinder portion 41 having a double-wall structure consisting of an inner wall 41a and an outer wall 41b is formed integrally in the center portion of the elevating member 40. A through hole portion 42 fitted on the cylinder portion 38 of the turntable 31 is formed on the inside of the inner wall 41a. Also, a holding groove 41c for holding the clamping spring 43 is formed between the inner wall 41a and the outer wall 41b. Also, housing projections 44 each of which has an engaging portion 44a at the top end portion and has a bent portion 44b (see FIG. 10) at the lower end portion are provided to the outermost periphery of the cylinder portion 41 to correspond to the fitting locations of the chuck claws 35. When the elevating member 40 descends, the engaging portion 44a of the housing projection 44 is engaged with the stepped groove portion 35b of the chuck claw 35 such that the chuck claw 35 is turned on the pivot 34 and is pulled into the chuck claw fitting window 37.

As shown in FIG. 10, the pushing member 36 is provided in vicinity of the housing projection 44 on the right and left sides. This pushing member 36 pushes the base end portion 35a of the chuck claw 35 along with a rise of the elevating member 40, and causes the chuck claw 35 to turn around the pivot 34 and protrude the chuck claw 35 from the chuck claw fitting window 37.

Also, a groove portion 47b with which an acting end 51a of an energizing spring 50 engages is formed on one end of the coupling plate 47. As shown in FIG. 7(C), a fixed end 51b of the energizing spring 50 positioned on the opposite side to the acting end 51a is engaged with a through hole of a wall portion 21a that is formed integrally with the suspension chassis 21. Accordingly, the coupling plate 47 is always energized clockwise by a spring force of the energizing spring 50.

Figure 4:
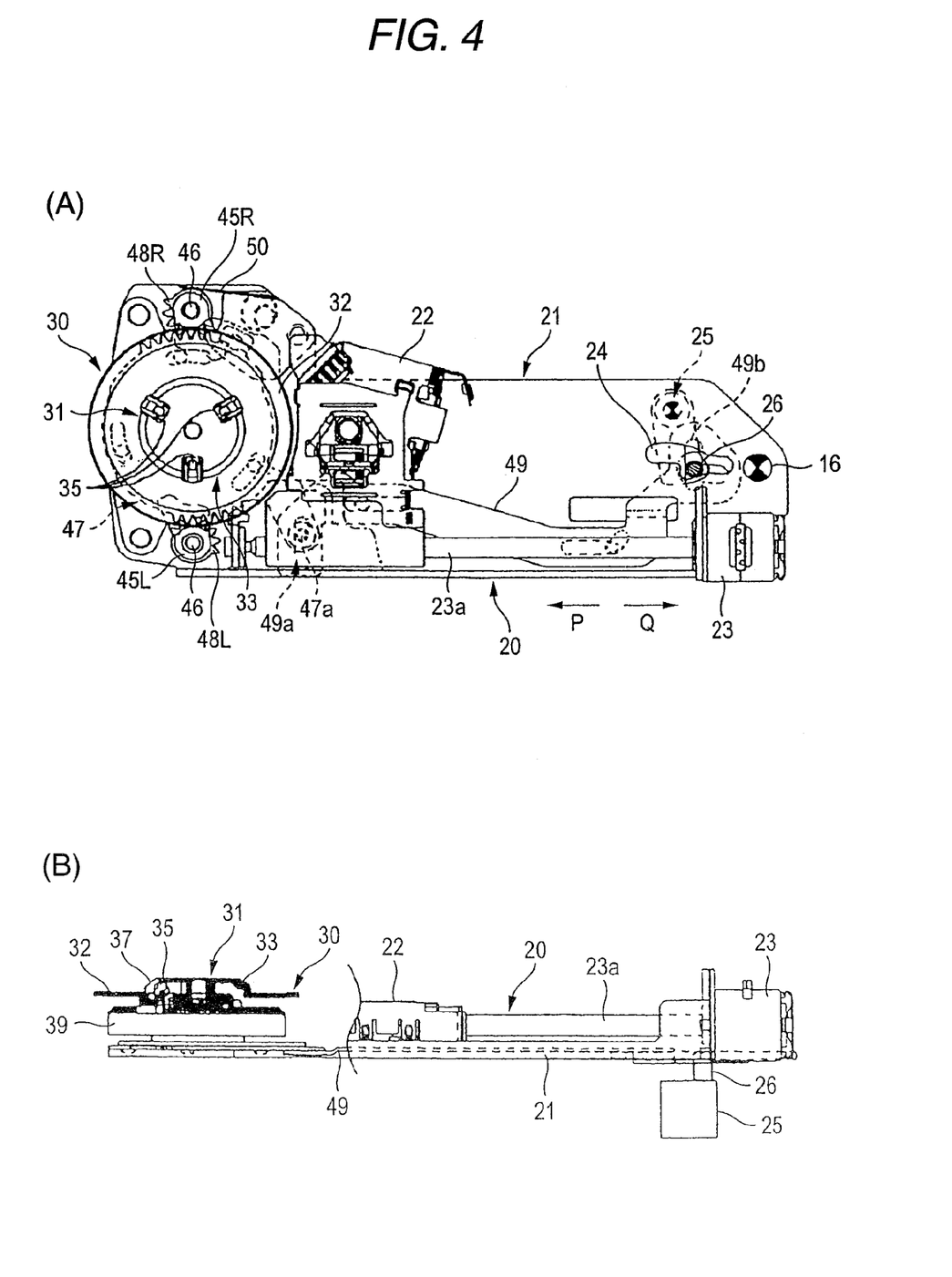
Figure 11:
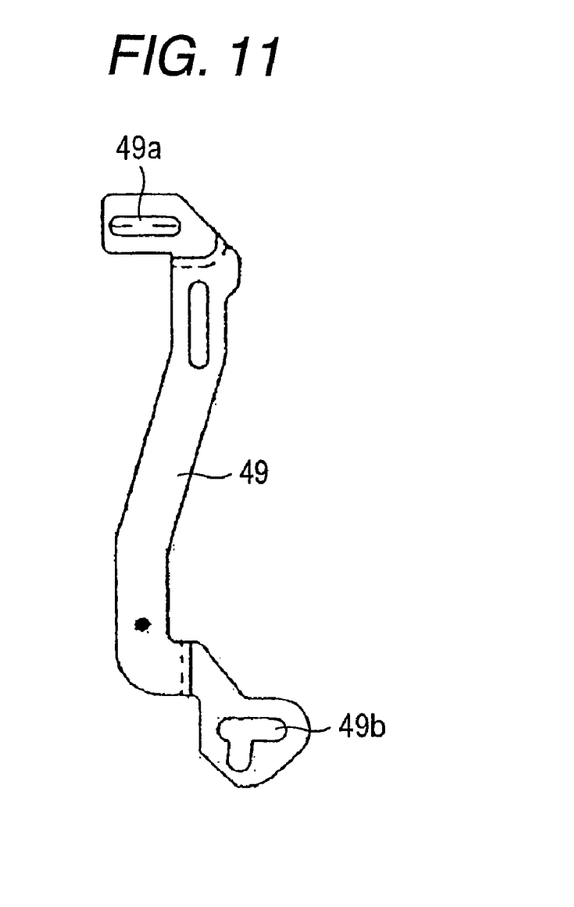
FIG. 11 A plan view of a driving lever of the optical disc device according to the embodiment of the present invention.

As shown in FIG. 11, the driving lever 49 is formed by the long member along the longitudinal direction (the lateral direction in FIG. 4) of the suspension chassis 21. The cam groove 49a is formed on one end of the driving lever 49 on the turntable 31 side, and the substantially T-shaped cam groove 49b is formed on the other end. As shown in FIG. 4, the driving shaft 47a of the coupling plate 47 is engaged with the cam groove 49a. The coupling plate 47 is turned clockwise in FIG. 4 via the driving shaft 47a that is engaged with the cam groove 49a of the driving lever 49.

In contrast, the cam groove 49b of the driving lever 49 engages with the turning/driving shaft 26 provided upright on the turning lever 25. The turning/driving shaft 26 also engages with the cam groove 24 formed on the suspension chassis 21. That is, the turning/driving shaft 26 passes through the substantially T-shaped cam groove 49a and the substantially Y-shaped cam groove 24 in the members, which are stacked in order of the turning lever 25, the driving lever 49, and the suspension chassis 21 from the bottom, and engages with them.

With this engaging structure, the turning lever 25 can swing the suspension chassis 21 and move the driving lever 49 in the P direction in FIG. 4 via the turning/driving shaft 26. That is, when the turning lever 25 is turned, first the turning/driving shaft 26 moves along the cam groove 24 while being pushed by the turning lever 25 and thus the suspension chassis 21 is swung. When a swinging operation of the playing portion 20 is completed, next the turning/driving shaft 26 that is to be further turned moves in a cam groove portion 24a formed as the long groove of the cam groove 24 to push the cam groove 49b while maintaining a posture of the suspension chassis 21. Thus, the driving lever 49 is moved toward the center direction (the P direction in FIG. 4) of the disc 12. As a result, the turning operation of the suspension chassis 21 and the disc holding operation can be performed by a series of operations of the turning lever 25.

Figure 12:
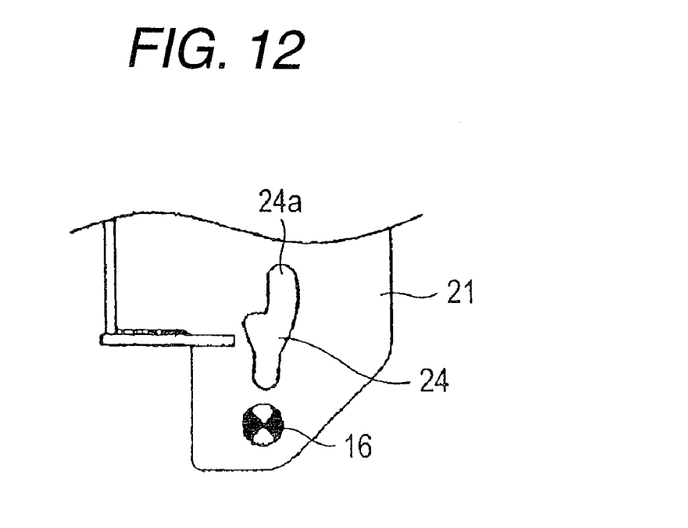
FIG. 12 An enlarged view of a cam groove portion of a suspension chassis of the optical disc device according to the embodiment of the present invention.

As shown in FIG. 12, the substantially Y-shaped cam groove 24 is formed in vicinity of the shaft 16 of the suspension chassis 21. One leg of the Y-shaped cam groove 24 is formed as a short groove, and the other leg is formed as a long groove (the cam groove portion 24a). When the turning/driving shaft 26 of the turning lever 25 is moved along the cam groove portion 24a, the cam groove 24 can move the driving lever 49 in the P direction in FIG. 4 while maintaining a posture of the suspension chassis 21 whose swinging operation is completed.

Next, a playing operation of the disc 12 in the optical disc device 10 constructed as above will be explained hereunder.

First, a boundary between predetermined trays 14 is opened by a tray opening unit. Then, the turning lever 25 is turned by a driving source (not shown) in the arrow A direction in FIG. 2. Thus, the suspension chassis 21 is turned on the shaft 16 by the cam groove 24 formed on the suspension chassis 21 and the turning/driving shaft 26 in the arrow A direction from a standby position shown in FIG. 2 to a playing position shown in FIG. 3.

Accordingly, the suspension chassis 21 is inserted into a boundary between predetermined trays 14. Then, the optical disc device 10 is brought into a playable state shown in FIG. 3 by moving the driving lever 49 to the center direction of the disc, and the disc 12 is held by the above clamping mechanism 30. The information recorded on the disc 12 is reproduced by turning the disc 12 while moving the pickup 22 along the suspension chassis 21.

Here, a plurality of chuck claws 35 are retracted on the inside of the chuck claw fitting windows 37 respectively before the disc 12 is loaded on the turntable 31. When the disc 12 is loaded on the loading portion 32 of the turntable 31 in this state, the turning lever 25 is further turned by a driving unit (not shown). Then, the driving lever 49 starts a movement to the center direction (the P direction in FIG. 4) of the disc 12 by the turning/driving shaft 26 and the cam groove 49b formed in the driving lever 49.

At this time, in the cam groove 24 on the suspension chassis 21, the turning/driving shaft 26 passes through the cam groove portion 24a (see FIG. 12) formed on the path of the turning lever 25. Therefore, the suspension chassis 21 never moves while keeping a posture, nevertheless only the movement of the driving lever 49 necessary for the disc holding operation can be allowed. As a result, the turning operation of the suspension chassis 21 and the disc holding operation can be performed by a series of operations of the turning lever 25.

Accordingly, the driving shaft 47a of the coupling plate 47 touches an end surface of the cam groove 49a of the driving lever 49 to turn the coupling plate 47 clockwise. Then, a power is transmitted via the gear portions 47L, 47R of the coupling plate 47 and the gear portions 48L, 48R of the elevating levers 45L, 45R. Thus, both elevating levers 45L, 45R are turned in the direction along which they go away from a center of the turntable 31 (an arrow S direction in FIG. 5(A)). As a result, both elevating levers 45L, 45R are withdrawn from a space between the turntable 31 and the elevating member 40, and the elevating member 40 is lifted up by a spring force of the spring 43.

At this time, the pushing portion 36a (see FIG. 8) of the pushing member 36 (see FIG. 10) contacts the base end portions 35a of a plurality of chuck claws 35 along with the lifting of the elevating member 40 to push up them. Therefore, a plurality of chuck claws 35 are turned on the pivot 34 in an arrow X1 direction in FIG. 6 to protrude from the chuck claw fitting windows 37, and can clamp the disc 12 (see FIG. 8).

The coupling plate 47 for causing the elevating levers 45L, 45R to turn is always energized previously by the energizing spring 50 in the direction along which this coupling plate 47 is turned clockwise, and the elevating member 40 ascends smoothly along the taper 45a on the top end in synchronism with the operations of the elevating levers 45L, 45R. Therefore, a sudden load variation due to a contact frictional force between the elevating member 40 and the elevating levers 45L, 45R can be suppressed, a sudden contact of the chuck claws 35 to the disc 12 can be avoided, and a noise caused in holding the disc 12 can be reduced.

In contrast, when the disc 12 is released from the disc holding state shown in FIG. 7 and FIG. 8, the turning lever 25 starts to turn in the arrow A direction in FIG. 3. Thus, the driving lever 49 is moved away from the turntable 31 (the Q direction in FIG. 4) by the cam groove 49b formed on the driving lever 49 and shown in FIG. 4 and the turning/driving shaft 26. As a result, the coupling plate 47 is turned counterclockwise in FIG. 7(A) by the action between the cam groove 49a provided to the top end of the driving lever 49 and the driving shaft 47a of the coupling plate 47, and also the elevating levers 45L, 45R are rotated toward the center of the turntable 31 (the arrow R direction in FIG. 7(A)) via the gear portions 47L, 47R of the coupling plate 47 and the gear portions 48L, 48R of the elevating levers 45L, 45R respectively.

According to this rotating operation, the elevating levers 45L, 45R edge into the space between the elevating member 40 and the turntable 31, and move the elevating member 40 toward the rotating motor 39 side (downward in FIG. 8) against the energizing force of the spring 43. At this time, the pushing portion 36a of the elevating member 40 is disengaged from the base end portions 35a of the chuck claws 35, but the engaging portions 44a of the housing projections 44 of the elevating member 40 is engaged with the stepped groove portions 35b provided to the rear surfaces of the chuck claws 35. Hence, the chuck claws 35 are turned on the pivot 34 as a rotating fulcrum in the arrow X2 direction in FIG. 8. As a result, the chuck claws 35 are retracted into the chuck claw fitting windows 37 respectively, and the clamping operation of the disc 12 is released. In addition, the suspension chassis 21 is turned by the cam groove 49b formed on the suspension chassis 21 because the driving lever 49 still continues to turn, so that the suspension chassis 21 can return to the state in FIG. 5.

According to such optical disc device 10 of the embodiment of the present invention, a driving force for turning the suspension chassis 21 via the turning/driving shaft 26 of the turning lever 25 can be transmitted to the driving lever by the substantially Y-shaped cam groove 24 formed on the suspension chassis 21 and the substantially T-shaped cam groove 49a formed on the driving lever 49 through a series of operations of the turning lever 25. Therefore, the turning operation of the suspension chassis 21 and the disc clamping/unclamping operation of the clamping mechanism 30 can be carried out by a single operation of the turning lever 25. As a result, a reduction in number of articles and a reduction in size of the disc drive can be achieved and a stable playing/writing operation can be carried out by eliminating a discrepancy in operation timings.

Also, according to the optical disc device 10 of the embodiment of the present invention, the coupling plate 47 for turning the elevating levers 45L, 45R is always energized by the energizing spring 50 to hold the disc 12. Therefore, a sudden contact of the chuck claws 35 to the disc 12 can be avoided, and a noise caused in holding the disc can be reduced. Also, the coupling plate 47 and a pair of elevating levers 45L, 45R are engaged with each other via the gear portions 47L, 47R, 48L, 48R respectively. Therefore, a discrepancy in timings to operate the elevating levers 45L, 45R can be prevented.

Here, the present invention is not limited to the above optical disc device 10 in which plural sheets of discs 12 are stacked/loaded and the disc 12 is played selectively, as described above. Also, the present invention can be applied similarly to the optical disc device of the type the disc 12 is inserted one by one and played respectively.

With the above, the embodiment of the present invention is explained, but the present invention is not limited to the matters shown in the embodiment. Changes and adaptations made by those skilled in the art based on the descriptions of the specification and the well-known technologies are acceptable to the present invention, and are contained in a scope over which a protection is sought.

This application is based upon Japanese Patent Application (Patent Application No. 2005-013036) filed on Jan. 20, 2005; the contents of which are incorporated herein by reference.

INDUSTRIAL APPLICABILITY

As described above, the optical disc device according to the present invention is constructed in such a manner that the substantially Y-shaped cam groove formed on the suspension chassis and the substantially T-shaped cam groove formed on the driving lever are turned via the turning/driving shaft of the turning lever, and as a result a driving force for turning the suspension chassis can be transmitted to the driving lever through a series of operations of the turning lever. Therefore, the optical disc device according to the present invention possesses such advantages that the turning operation of the suspension chassis and the disc clamping/unclamping operation of the clamping mechanism can be carried out by a single operation of the turning lever and that a reduction in number of articles and a reduction in size of the disc drive can be achieved and also a stable playing/writing operation can be carried out by eliminating a discrepancy in operation timings, and is useful to the optical disc device for CD, DVD, etc., particularly the optical disc device in which a center hole of the disc is held on the turntable, and the like.

The invention claimed is:

1. An optical disc device, comprising:
   a main body;
   a clamping mechanism which holds a disc releasably on a turntable;
   a playing chassis which is supported turnably on the main body and on which the turntable is mounted;
   a substantially Y-shaped cam groove which is formed on the playing chassis;
   a driving lever on which a substantially T-shaped cam groove is formed and which transmits a power to a holding portion of the disc; and
   a turning lever which is turnably supported on the main body and engaged with the playing chassis and the cam groove of the driving lever through a driving shaft,
   wherein a turning of the turning lever is followed by a turning of the playing chassis and a movement of the driving lever as a series of operations.

2. The optical disc device according to claim 1, wherein the driving shaft of the turning lever passes through the substantially T-shaped cam groove of the driving lever and the substantially Y-shaped cam groove of the playing chassis to engage with the cam grooves; and
   wherein the playing chassis and the driving lever are moved to follow the turning of the turning lever as a series of operations such that the playing chassis swings when the turning lever being turned pushes the substantially Y-shaped cam groove through the driving shaft and then the driving lever moves when the driving shaft being moved in the substantially Y-shaped cam groove pushes the substantially T-shaped cam groove while maintaining a posture of the playing chassis.

3. The disc changer drive equipped with the optical disc device set forth in claim 1.

* * * * *